(12) United States Patent
Leung et al.

(10) Patent No.: US 12,485,890 B2
(45) Date of Patent: Dec. 2, 2025

(54) LEARNING AUTONOMOUS VEHICLE SAFETY CONCEPTS FROM DEMONSTRATIONS

(71) Applicant: NVIDIA Corporation, Santa Clara, CA (US)

(72) Inventors: Karen Yan Ming Leung, Los Altos, CA (US); Sushant Veer, Sunnyvale, CA (US); Edward Fu Schmerling, Los Altos, CA (US); Marco Pavone, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 276 days.

(21) Appl. No.: 18/183,566

(22) Filed: Mar. 14, 2023

(65) Prior Publication Data

US 2024/0010196 A1    Jan. 11, 2024

Related U.S. Application Data

(60) Provisional application No. 63/359,414, filed on Jul. 8, 2022.

(51) Int. Cl.
*B60W 30/095* (2012.01)
*B60W 30/09* (2012.01)
*B60W 60/00* (2020.01)

(52) U.S. Cl.
CPC ........ *B60W 30/0956* (2013.01); *B60W 30/09* (2013.01); *B60W 60/0015* (2020.02); *B60W 2554/4041* (2020.02)

(58) Field of Classification Search
CPC ............ B60W 30/0956; B60W 30/09; B60W 60/0015; B60W 2554/4041
See application file for complete search history.

(56) References Cited

U.S. PATENT DOCUMENTS 11,807,233 B1 * 11/2023 Clawson ............... B60W 30/09
2018/0141544 A1 * 5/2018 Xiao .................. G01C 21/3469
(Continued)

OTHER PUBLICATIONS

Van Koevering, et al.; "Provable Probabilistic Safety and Feasibility-Assured Control for Autonomous Vehicles using Exponential Control Barrier Functions," https://arxiv.org/abs/2205.03744; May 8, 2022, 6 pgs.
(Continued)

*Primary Examiner* — Tarek Elarabi
(74) *Attorney, Agent, or Firm* — Iron Summit IP LLP

(57) ABSTRACT

In various examples, control policies for controlling agents may be learned from demonstrations capturing joint states of entities navigating through the environment. A control policy may be learned mapping joint states to control actions, where the joint states are between agents, and the control actions are of at least one of the agents. The control policy may be learned to define the mappings as control invariant sets of the joint sates and the control actions. The control policy may be used to determine one or more functions that compute, based at least on a joint state between entities, output indicating a likelihood of collision between the entities operating in accordance with the control policy. Using the output, current and/or potential states of the environment may be evaluated to determine control operations for a machine, such as a vehicle.

20 Claims, 13 Drawing Sheets

(56) References Cited

U.S. PATENT DOCUMENTS

| | | |
|---|---|---|
| 2019/0258251 A1 | 8/2019 | Ditty et al. |
| 2019/0265703 A1 | 8/2019 | Hicok et al. |
| 2019/0384303 A1 | 12/2019 | Muller et al. |
| 2021/0253128 A1 | 8/2021 | Nister et al. |
| 2021/0349460 A1 | 11/2021 | Huang et al. |
| 2022/0388540 A1* | 12/2022 | Fu .................... B60W 50/0098 |

OTHER PUBLICATIONS

Taylor, et al.; "Adaptive Safety with Control Barrier Functions," https://arxiv.org/abs/1910.00555; Oct. 1, 2019, 8 pgs.

Xiao, et al.; "Adaptive Control Barrier Functions," IEEE Transactions on Automatic Control, 2021.

Xiao, et al.; "Control Barrier Functions for Systems with Multiple Control Inputs," https://arxiv.org/abs/2203.07978; Mar. 15, 2022, 6 pgs.

Tonkens, et al.; "Refining Control Barrier Functions Through Hamilton-Jacobi Reachability," https://arxiv.org/abs/2204.12507; Aug. 19, 2022, 8 pgs.

Choi, et al.; "Robust Control Barrier-Value Functions for Safety-Critical Control," https://arxiv.org/abs/2104.02808; Oct. 25, 2021, 9 pgs.

Mitchell, I.M.; et al.; "A Time-Dependent Hamilton-Jacobi Formulation of Reachable Sets for Continuous Dynamic Games", IEEE Transactions on Automatic Control, vol. 50, No. 7, pp. 947-957, 2005.

Margellos, Kostas, et al.; "Hamilton-Jacobi Formulation for Reach-Avoid Differential Games", IEEE Transaction on Automatic Control, vol. 56, No. 8, pp. 1849-1861, 2011.

Leung, K., et al.; "Towards the Unification and Data-Driven Synthesis of Autonomous Vehicle Safety Concepts"; https://arxiv.org/abs/2107.14412, Jun. 20, 2022, 9 pgs.

Shalev-Shwartz, S., et al.; "On a Formal Model of Safe and Scalable Self-Driving Cars"; https://arxiv.org/abs/1708.06374, Oct. 27, 2018, 27 pgs.

Leung, K., et al.; "On Infusing Reachability-Based Safety Assurance within Planning Frameworks for Human-Robot Vehicle Interactions"; https://arxiv.org/abs/2012.03390, Dec. 6, 2020, 18 pgs.

Bradbury, J., et al.; "JAX: composable transformations of Python+ NumPy programs", 2018. URL http://github.com/google/jax.

Nister, D. et al., "An Introduction to the Safety Force Field", NVIDIA, Mar. 2019, 27 pgs.

"IEEE Standard for Assumptions in Safety-Related Models for Automated Driving Systems," IEEE Std 2846-2022, 2022.

Van den Berg, et al.; "Reciprocal Velocity Obstacles for Real-Time Multi-Agent Navigation," in IEEE International Conference on Robotics and Automation, 2008.

Chen, et al.; "Multi-Vehicle Collision Avoidance via Hamilton-Jacobi Reachability and Mixed Integer Programming," in IEEE Conference on Decision and Control, 2016.

Wang, et al.; "Infusing Reachability-Based Safety into Planning and Control for Multi-Agent Interactions," in IEEE/RSJ International Conference on Intelligent Robots and Systems, 2020.

Guo, et al.; "VR-ORCA: Variable Responsibility Optimal Reciprocal Collision Avoidance," IEEE Robotics and Automation Letters, vol. 6, No. 3, pp. 4520-4527, 2021.

Robey, et al.; "Learning Control Barrier Functions from Expert Demonstrations," in IEEE Conference on Decision and Control, 2020, pp. 3717-3724.

Qin, et al.; "Learning Safe Multi-Agent Control with Decentralized Neural Barrier Certificates," International Conference on Learning Representations, 2021.

Ziebart, et al.; "Maximum Entropy Inverse Reinforcement Learning," in AAAI Conference on Artificial Intelligence, vol. 8, 2008, pp. 1433-1438.

Wilkie, et al.; "Generalized Velocity Obstacles," in IEEE/RSJ International Conference on Intelligent Robots and Systems, 2009, pp. 5573-5578.

Farid, et al.; "Task-Driven Out-of-Distribution Detection with Statistical Guarantees for Robot Learning"; Proceedings of the Conference on Robot Learning, 2021, 11 pgs.

Althoff, et al.; "Online Verification of Automated Road Vehicles Using Reachability Analysis"; 30(4):903-918, 2014, 16 pgs.

Tian, et al.; "Safety Assurances for Human-Robot Interaction via Confidence-Aware Game-Theoretic Human Models"; arXiv:2109.14700; Oct. 30, 2021, 7 pgs.

Farid, et al.; "Failure Prediction with Statistical Guarantees for Vision-Based Robot Control"; arXiv:2202.05894; May 6, 2022, 13 pgs.

Rudenko, et al.; "Human Motion Trajectory Predication: A Survey," https://arxiv.org/abs/1905.06113; Dec. 17, 2019; 37 pgs.

Phan-Minh, et al.; "Driving in Real Life with Inverse Reinforcement Learning," https://arxiv.org/abs/2206.03004; Jun. 7, 2022, 23 pgs.

Oboril, et al.; "MTBF Model for AVs—from perception errors to vehicle-level failures," 2022.

Abbeel, et al.; "Apprenticeship Learning via Inverse Reinforcement Learning," In Int. Conf. on Machine Learning, 2004, 8 pgs.

Levine, et al.; "Continuous Inverse Optimal Control with Locally Optimal Examples," https://arxiv.org/abs/1206.4617; 2012, 8 pgs.

Sadigh, et al., "Planning for Autonomous Cars That Leverage Effects on Human Actions," In Robotics: Science and Systems, 2016, 9 pgs.

Wu, et al.; "Efficient Sampling-Based Maximum Entropy Inverse Reinforcement Learning with Application to Autonomous Driving," https://arxiv.org/abs/2006.13704; Jun. 22, 2020, 9 pgs.

Xiao, et al., "High Order Control Barrier Functions," IEEE Transactions on Automatic Control, 2021.

Fiorini, et al.; "Motion Planning in Dynamic Environments using Velocity Obstacles," Int. Journal of Robotics Research, 17(10-11):760-772, 1998, 27 pgs.

Holmes, et al.; "Reachable sets for safe, real-time manipulator trajectory design," https://arxiv.org/abs/2002.01591, Sep. 29, 2020, 14 pgs.

Kuwata, et al.; "Real-time Motion Planning with Applications to Autonomous Urban Driving," IEEE Transactions on Control Systems Technology, vol. 17, No. 5, Sep. 2009, 14 pgs.

Janson, et al.; "Safe Motion Planning in Unknown Environments: Optimally Benchmarks and Tractable Policies," https://arxiv.org/abs/1804.05804; Apr. 16, 2018, 10 pgs.

Fridovich-Keil, et al.; "Confidence-Aware Motion Prediction for Real-time Collision Avoidance," In Int. Journal of Robotics Research, 2019.

Ames, et al.; "Control Barrier Functions: Theory and Applications," https://arxiv.org/abs/1903.11199, Mar. 27, 2019, 12 pgs.

Robey, et al.; "Learning Robust Hybrid Control Barrier Functions for Uncertain Systems," https://arxiv.org/abs/2101.06492, May 13, 2021, 17 pgs.

Prabhakar, et al.; "Credit Assignment Safety Learning from Human Demonstrations," https://arxiv.org/abs/2110.04633; Oct. 9, 2021, 5 pgs.

Lyu, et al.; "Adaptive Safe Merging Control for Heterogeneous Autonomous Vehicles using Parametric Control Barrier Functions," https://arxiv.org/abs/2202.09936; Feb. 20, 2022, 6 pgs.

Clark, "Verification and Synthesis of Control Barrier Functions", https://arxiv.org/abs/2104.14001; Apr. 28, 2021, 8 pgs.

Sill; "Monotonic Networks," In Conf. on Neural Information Processing Systems, 1997, 7 pgs.

Wehenkel, et al.; "Unconstrained Monotonic Neural Networks," https://arxiv.org/abs/1908.05164; Mar. 31, 2021, 14 pgs.

Chen, et al.; "Counter-Example Guided Learning of Bounds on Environmental Behavior," https://arxiv.org/abs/2001.07233; Feb. 6, 2020, 11 pgs.

Von Neumann; "Zur Theorie der Gesellschaftsspiele" Mathematische Annalen, 100(1):295-320, 1927, 26 pgs.

Schmerling, et al.; "Multimodal Probabilistic Model-Based Planning for Human-Robot Interaction," https://arxiv.org/abs/1710.09483; Oct. 25, 2017, 8 pgs.

"Next Generation Simulation (NGSIM) Vehicle Trajectories and Supporting Data," U.S. Department of Transportation Intelligent Transportation Systems Joint Program, 2016.

(56) References Cited

OTHER PUBLICATIONS

Chen, et al.; "Exact and Efficient Hamilton-Jacobi-based Guaranteed Safety Analysis via System Decomposition," https://arxiv.org/abs/1609.05248; Sep. 16, 2016; 9 pgs.

Herbert, et al.; "Scalable learning of safety guarantees for autonomous systems using Hamilton-Jacobi reachability," https://arxiv.org/abs/2101.05916; Apr. 2, 2021, 7 pgs.

Bansal, et al.; "DeepReach: A Deep Learning Approach to High-Dimensional Reachability," https://arxiv.org/abs/2011.02082; Nov. 4, 2020, 9 pgs.

Fisac, et al.; "Bridging Hamilton-Jacobi Safety Analysis and Reinforcement Learning," In Proc. IEEE Conf. on Robotics and Automation, 2019.

Tsaknakis, et al.; "Minimax Problems with Coupled Linear Constraints: Computational Complexity, Duality and Solution Methods," https://arxiv.org/abs/2110.11210; Nov. 26, 2022, 29 pgs.

Goktas, et al.; "Convex-Concave Min-Max Stackelberg Games," https://arxiv.org/abs/2110.05192' Jul. 5, 2023, 34 pgs.

\* cited by examiner

700

```
┌─────────────────────────────────────────────┐
│ LEARN, FROM DEMONSTRATIONS, ONE OR MORE     │
│ CONTROL POLICIES MAPPING JOINT STATES OF    │
│ AT LEAST TWO ENTITIES TO CONTROL ACTIONS    │
│                   B702                      │
└─────────────────────────────────────────────┘
                      ↓
┌─────────────────────────────────────────────┐
│ DETERMINE, USING THE ONE OR MORE CONTROL    │
│ POLICIES, A LIKELIHOOD OF COLLISION BETWEEN │
│ ENTITIES OPERATING IN ACCORDANCE WITH THE   │
│ ONE OR MORE CONTROL POLICIES                │
│                   B704                      │
└─────────────────────────────────────────────┘
                      ↓
┌─────────────────────────────────────────────┐
│ PERFORM ONE OR MORE CONTROL OPERATIONS FOR  │
│ A MACHINE BASED AT LEAST ON THE LIKELIHOOD  │
│ OF COLLISION                                │
│                   B706                      │
└─────────────────────────────────────────────┘
```

FIGURE 7

LEARNING AUTONOMOUS VEHICLE SAFETY CONCEPTS FROM DEMONSTRATIONS

CROSS-REFERENCE TO RELATED APPLICATIONS

This application claims the benefit of U.S. Provisional Application No. 63/359,414, filed on Jul. 8, 2022, which is hereby incorporated by reference in its entirety.

BACKGROUND

To operate safely, autonomous vehicles should be capable of traversing a path through an environment without colliding with other objects (e.g., vehicles, people, trees, animals, buildings, etc.). In order to accomplish this goal, autonomous vehicles should account for the other objects when planning paths through the environment. Conventional approaches to planning a path for an autonomous vehicle use safety concepts to map world state to some measure of safety and to define a set of allowable (safe) agent actions. Different safety concepts incorporate different behavioral assumptions that impact the safety and performance of an autonomous vehicle. Behavioral assumptions implemented in conventional safety concepts range from worst-case assumptions regarding agent behavior to more relaxed assumptions, such as presuming agents will follow fixed open-loop trajectories.

Worst-case assumptions regarding agent behavior may result in safety concepts that are over conservative—limiting the flexibility for controlling an autonomous vehicle, but advantageously providing high guarantees of safety. For example, over conservatism may restrict autonomous vehicles from performing natural and/or desirable vehicle maneuvers (e.g., maneuvering into an adjacent lane in slow traffic when another vehicle is to the side of the autonomous vehicle). More relaxed assumptions regarding agent behavior may result in safety concepts that are over optimistic—providing high flexibility to controlling an autonomous vehicle without high guarantees of safety.

SUMMARY

Embodiments of the present disclosure relate to learning autonomous vehicle safety concepts from demonstrations. Systems and methods are disclosed that learn a control policy for controlling an agent, such as an autonomous vehicle, in an environment from demonstrations and use the control policy to evaluate likelihoods of collision in order to control the agent.

In contrast to conventional systems, such as those described above, aspects of the present disclosure provide for learning control policies for controlling agents from demonstrations. The demonstrations may capture joint states of entities navigating through the environment. One or more control policies may be learned mapping joint states to control actions, where the joint states are between agents, and the control actions are of at least one of the agents. The one or more control policies may be learned to define the mappings as control invariant sets of the joint sates and the control actions. The one or more control policies may be used to determine one or more functions that compute, based at least on one or more joint states between entities, output indicating a likelihood of collision between the entities when the entities operate in accordance with the one or more control policies. Using the output, current and/or potential states of the environment may be evaluated to determine one or more control operations for a machine, such as a vehicle.

BRIEF DESCRIPTION OF THE DRAWINGS

The present systems and methods for learning autonomous vehicle safety concepts from demonstrations are described in detail below with reference to the attached drawing figures, wherein:

FIG. 7 is a flow diagram showing a method for learning vehicle safety concepts from demonstrations, in accordance with some embodiments of the present disclosure;

DETAILED DESCRIPTION

Figure 1:
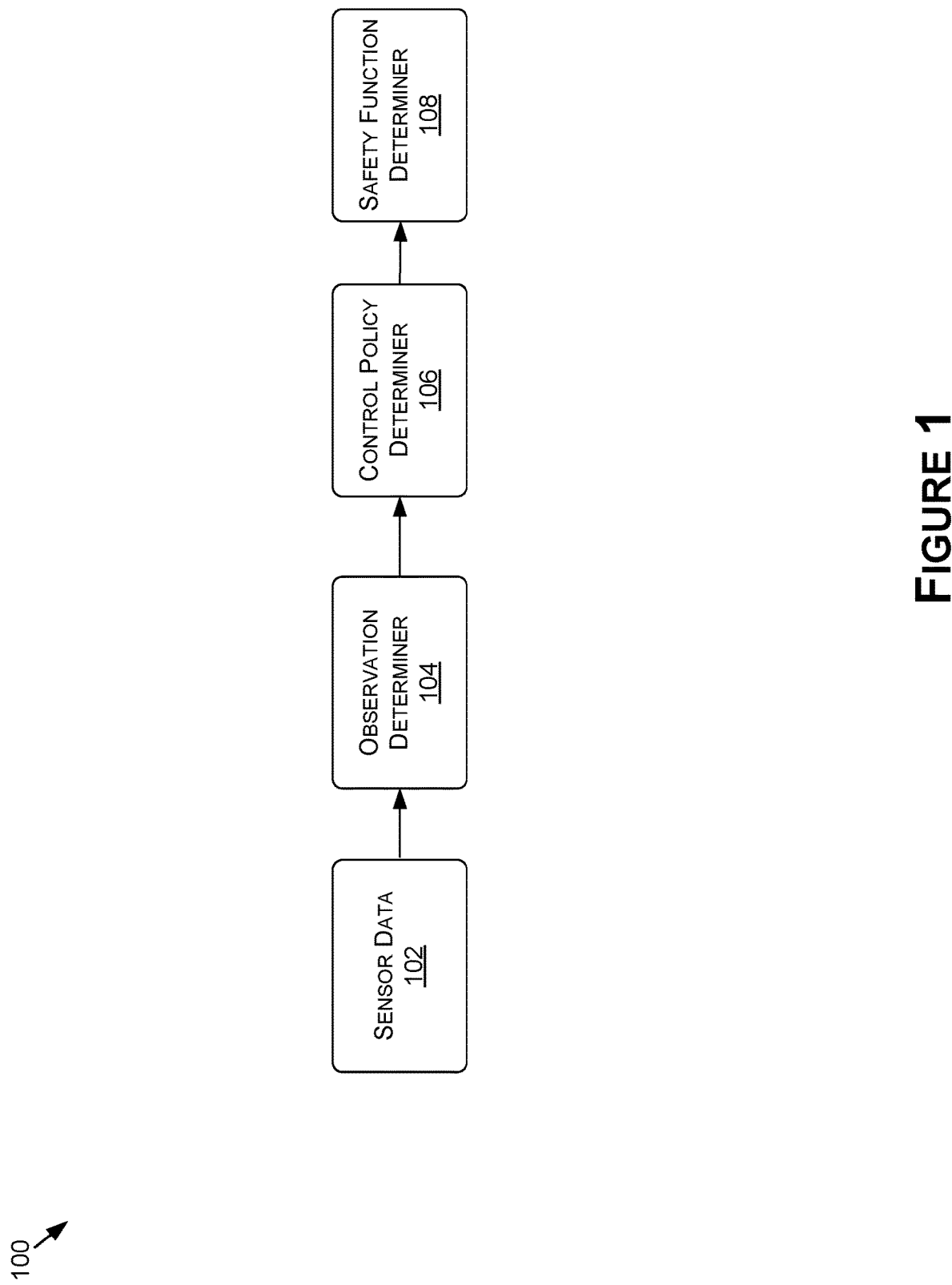
FIG. 1 includes an example data flow diagram for a process of learning safety functions from demonstrations, in accordance with some embodiments of the present disclosure.

Systems and methods are disclosed related to learning autonomous vehicle safety concepts from demonstrations. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to determining control operations for a machine, such as an autonomous vehicle, this is not intended to be limiting, and the systems and methods described herein may be used in augmented reality, virtual reality, mixed reality, robotics, security and surveillance, autonomous or semi-autonomous machine applications, and/or any other technology spaces where evaluations of entity movement may be used.

Aspects of the present disclosure provide for learning control policies for controlling agents from demonstrations. The demonstrations may capture joint states of entities navigating through the environment (e.g., while avoiding collisions during routine driving). By learning the control policies from the demonstrations, safety concepts may be implemented to control machines, such as autonomous vehicles, while accounting for safe, reasonable, and/or expected driving behavior for the machines and/or other entities. In at least one embodiment, sensor data is applied to one or more machine learning models to learn one or more control policies mapping joint states to control actions, where the joint states are between agents, and the control actions are of at least one of the agents. The one or more control policies may be learned to define the mappings as control invariant sets of the joint sates and the control actions. As such, operating a vehicle using the control actions may ensure the vehicle is capable of continuing to operate in accordance with the mappings, which may ensure collision-free navigation is possible. In at least one embodiment, a control policy is learned using a control barrier function to impose control constraints that ensure the mappings provide control invariance.

The one or more control policies may be used to determine one or more functions that compute, based at least on one or more joint states between entities, output indicating a likelihood of collision between the entities when the entities operate in accordance with the one or more control policies. Using the output, current and/or potential states of the environment may be evaluated to determine one or more control operations for a machine, such as a vehicle. For example, a safety distance function may be used to provide output indicating a distance to collision and/or another defined state (e.g., using one or more scalar values). Additionally, or alternatively, a safety control function may be used to provide output indicating one or more control actions that prevent the distance to collision from decreasing or otherwise violating one or more criteria.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 includes an example data flow diagram for a process 100 of learning safety functions from demonstrations, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

The process 100 may include generating and/or receiving sensor data 102 generated using one or more sensors. In one or more embodiments, the sensor data 102 may include at least one of one or more physical sensors in a physical environment or one or more virtual sensors in a simulated environment. For example, the one or more sensors may correspond to a physical or simulated version of the vehicle 800, as described herein.

The sensor data 102 may include, without limitation, sensor data 102 from any of the sensors of the vehicle 800 (and/or other vehicles or objects, such as robotic devices, VR systems, AR systems, etc., in some examples). For example, and with reference to FIGS. 8A-8C, the sensor data 102 may include the data generated by, without limitation, global navigation satellite systems (GNSS) sensor(s) 858 (e.g., Global Positioning System sensor(s), differential GPS (DGPS), etc.), RADAR sensor(s) 860, ultrasonic sensor(s) 862, LIDAR sensor(s) 864, inertial measurement unit (IMU) sensor(s) 866 (e.g., accelerometer(s), gyro scope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800 and/or distance traveled), and/or other sensor types.

In some examples, the sensor data 102 may include sensor data generated using one or more forward-facing sensors, side-view sensors, and/or rear-view sensors. This sensor data 102 may be useful for identifying, detecting, classifying, and/or tracking movement of objects around the vehicle 800 within the environment. In embodiments, any number of sensors may be used to incorporate multiple fields of view (e.g., the fields of view of the long-range cameras 898, the forward-facing stereo camera 868, and/or the forward facing wide-view camera 870 of FIG. 8B) and/or sensory fields (e.g., of a LIDAR sensor 864, a RADAR sensor 860, etc.).

The sensor data 102 may include image data representing an image(s), image data representing a video (e.g., snapshots of video), data representing sensory fields of sensors (e.g., depth maps for LIDAR sensors, a value graph for ultrasonic sensors, etc.), and/or data representing measurements of sensors. Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 may be used, at least in part, by an observation determiner 104 to generate one or more observations of one or more entities, such as an ego actor and/or other actors or entities in an environment. An observation may correspond to one or more states of the environment where a state of the environment may correspond to one or more particular times or time steps. For example, the observation determiner 104 may determine a joint state of actors (e.g., the vehicle 800 and other objects, static or dynamic) in the environment. Additionally, the observation determiner 104 may determine one or more control actions taken by one or more of the actors based at least on the joint state of the actors.

A control action for an actor may include, for example, one or more parameters corresponding to steering and/or acceleration. The state of each entity or actor may generally include one or more of a location, a speed, a direction or heading (e.g., direction of travel), a velocity, an acceleration(s) (e.g., scalar, rotational, etc.), a pose (e.g., orientation) and/or other information about the state of the actors. As examples, a state may encode or represent the position of an actor in two-dimensional space (e.g., (x, y) coordinates), a unit direction of the actor, and/or a scalar velocity of the actor at a point in time. In some examples, the state may encode or represent additional or alternative information, such as rotational velocity (e.g., yaw) and/or scalar acceleration in any direction.

The observation determiner 104 may determine the state and/or one or more corresponding control actions using any combination of sensors, such as the GNSS sensors 858, the IMU sensor(s) 866, the speed sensor(s) 844, the steering sensor(s) 840, etc. In at least one embodiment, the observation determiner 104 may determine and/or infer the state of the objects in the environment—e.g., other than the vehicle 800—using any combination of the stereo camera(s) 868, the wide-view camera(s) 870, the infrared camera(s) 872, the surround camera(s) 874, the long range and/or mid-range camera(s) 898, the LIDAR sensor(s) 864, the RADAR sensor(s) 860, the microphone(s) 896, the ultrasonic sensor(s) 862, and/or other sensors of the vehicle 800. In some examples, the state of the objects (e.g., when one or more of the objects is another vehicle, or a person using a client device capable of wireless communication) may be determined using wireless communications, such as vehicle-to-vehicle communication, or device-to-vehicle communication, over one or more networks, such as, but not limited to, the network(s) described herein.

In at least one embodiment, the one or more observations of one or more entities, may include one or more characteristics of the environment, for example, to provide context to the joint states of the entities (e.g., semantic information). Examples of the one or more characteristics include road geometry characteristics, road feature characteristics (e.g., signs, road type, road markings, road conditions, etc.), weather characteristics, visibility characteristics, and/or other extrinsic characteristics which may impact the control action behavior of at least one of the entities. In at least one embodiment, the one or more observations may correspond to one or more driving maneuvers and/or types of driving maneuvers with respect to one or more actors, such as a lane change maneuver, a passing maneuver, a following maneuver, a parking maneuver, etc. In at least one embodiment, one or more of the observations may be assigned and/or associated with one or more scenarios. A scenario may be defied, for example, using one or more parameters indicating one or more environmental characteristics and/or driving maneuvers.

In some examples, machine learning models, such as neural networks (e.g., convolutional neural networks), may be used to determine the control actions and/or the states of the actors and/or the environment. For example, sensor data from the sensors of the vehicle 800 may be applied to one or more machine learning models in order to determine the state of the objects and/or the environment. The neural networks may execute on processed and/or unprocessed data for a variety of functions. For example, and without limitation, a convolutional neural network may be used for object detection and identification (e.g., using sensor data from camera(s) of the vehicle 800), a convolutional neural network may be used for distance estimation (e.g., using the sensor data from the camera(s) of the vehicle 800), a convolutional neural network may be used for emergency vehicle detection and identification (e.g., using sensor data from the microphone(s) of the vehicle 800), a convolutional neural network may be used for facial recognition and vehicle owner identification (e.g., using the sensor data from the camera(s) of the vehicle 800), a convolutional neural network may be used for identifying and processing security and/or safety related events, and/or other machine learning models may be used. In examples using convolutional neural networks, any type of convolutional neural networks may be used, including region-based convolutional neural networks (R-CNNs), Fast R-CNNs, and/or other types. In addition to or alternatively from CNNs, any other type of machine learning model may be implemented.

In embodiments where the sensor data 102 corresponds, at least in part, to simulated sensor data, the simulated sensor data may be generated using one or more simulators. For example, the simulated sensor data may correspond to simulation data generated using a simulation application, such as an autonomous vehicle drive simulator (e.g., NVIDIA's DRIVESIM).

The simulation data may include snapshots, pictures, samples and/or other data about the world state of the simulated or virtual world at each frame. For example, the simulated sensor data may include information about where actors are located in the world, their speeds, accelerations, poses, etc., information about the state of traffic lights or signals, information about the location of traffic signs, stop lines, etc. The world-state may be perceived by the vehicle 800, other vehicles, and/or other systems.

In one or more embodiments, the simulation data may be generated and/or analyzed in light of one or more scenarios, as described herein. For example, one or more scenarios of interest may be hard-coded, or created manually, may be procedurally generated, may be emergent, or otherwise may be manifested within the virtual and/or computational environment. The one or more observations may be determined from simulation data corresponding to the one or more scenarios. For example, one or more scenarios may be assigned to one or more of the observations for use in learning driving behavior for those scenarios.

Once the observations are determined and/or generated, the control policy determiner 106 may learn one or more control policies for one or more machines using the observations. For example, the one or more control policies may define state-dependent control sets comprising mappings between joint states of actors to control actions for at least one machine (e.g., an ego machine).

In one or more embodiments, the observations include a dataset $S=\{(x^{(i)}, u_A^{(i)})\}_{i=1}^N$ including N observations of a state x corresponding at least to an agent A and an agent B and agent A's control actions $u_A$. In one or more embodiments, the dataset S may correspond to safe interactions between entities A and B, for example, where no collisions occurred. It may be assumed that agent A (e.g., the ego machine) is unable to observe the control actions for agent B. The control policy determiner 106 may learn a mapping $\phi: X \rightarrow 2^{u^A}$ such that $u_A^{(i)} \in \phi(x^{(i)})$ for all $(x^{(i)}, u_A^{(i)}) \in S$. In one or more embodiments, the learned state-dependent control sets may be minimal in the sense that they contain the relevant points as tightly as possible. In one or more embodiments, learning the state-dependent control sets includes fitting one or more functions to the observations of the dataset S.

Figure 2B:
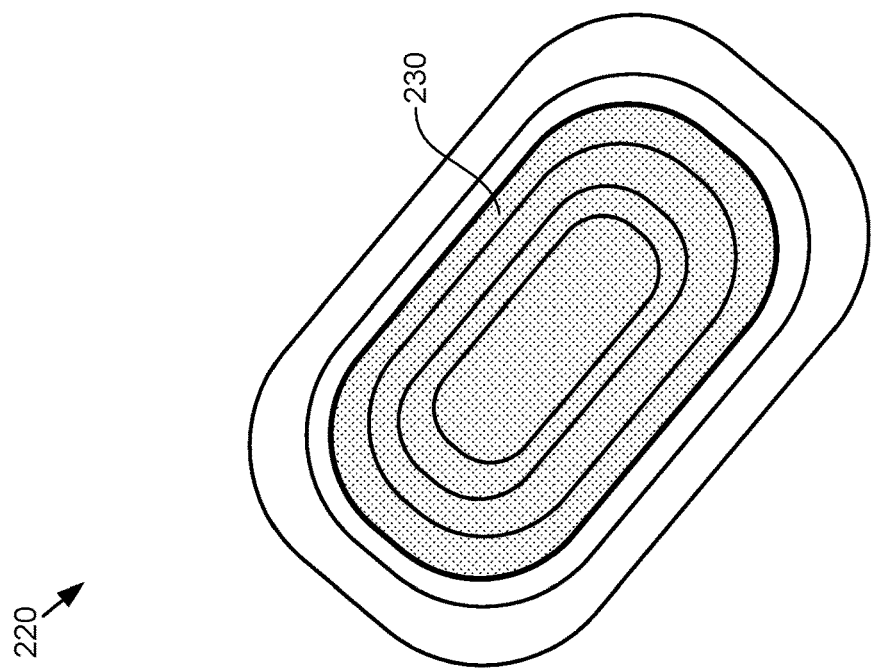
FIG. 2B includes an example graph of a control barrier space which may be used to learn control policies used to define safety functions from demonstrations, in accordance with some embodiments of the present disclosure.
Figure 2A:
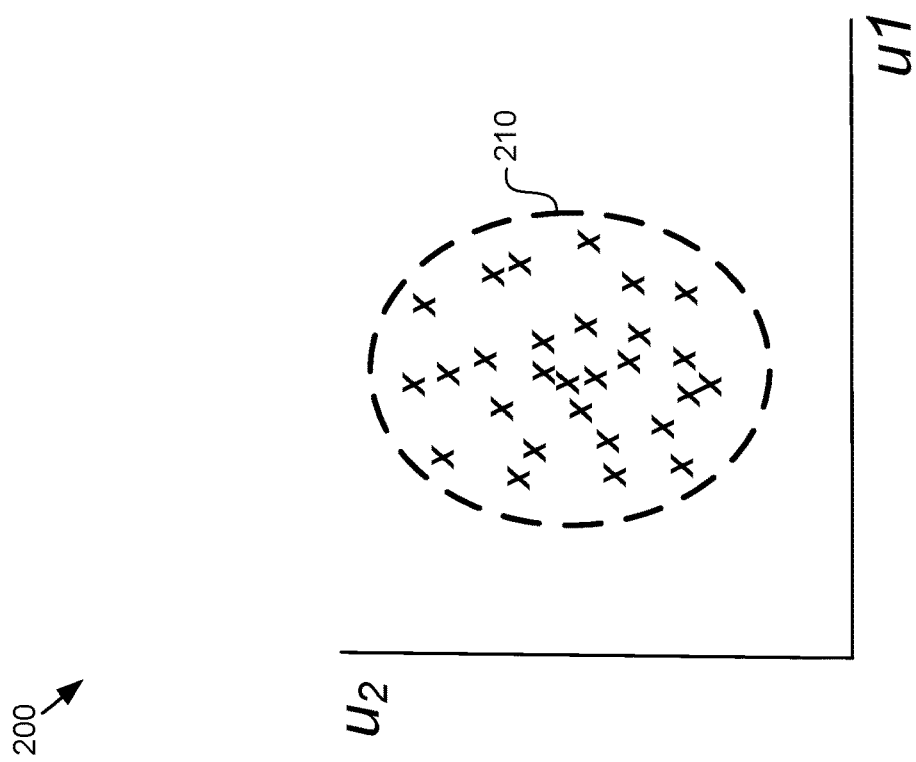
FIG. 2A includes an example graph of a control action space which may be learned for an environmental state, in accordance with some embodiments of the present disclosure.

Referring now to FIG. 2A, FIG. 2A includes an example graph 200 of a control action space 210 which may be learned for an environmental state, in accordance with some embodiments of the present disclosure. For example, the control policy determiner 106 may associate any number of observations with a given state. The control policy determiner 106 may use the control actions for the observations associated with a state x to learn a control action space 210 including state-dependent control sets U(x) for the state x. In FIG. 2A, the control actions (from observations) which may be used to learn the control action space 210 are indicated within the control action space 210.

Various approaches may be used to learn the one or more control policies. For example, the control policy determiner 106 may apply the one or more observations to one or more machine learning models to train the one or more machine learning models (MLMs) to output data indicating one or more control actions based at least on one or more joint states of one or more entities in the environment. In one or more embodiments, the one or more machine learning models may receive as input one or more parameters indicating (e.g., representing) the joint states of the entities. In one or more embodiments, the one or more machine learning models may receive as input one or more parameters indicating (e.g., representing) one or more scenarios and/or features thereof (e.g., environmental characteristic, etc.). The one or more machine learning models may output data indicating the one or more control actions. For example, the one or more machine learning models may be trained to predict the one or more control actions or data used to derive one or more control actions based at least on one or more scenarios.

For example and without limitation, any of the various MLMs described herein may include one or more of any type(s) of machine learning model(s), such as a machine learning model using linear regression, logistic regression, decision trees, support vector machines (SVM), Naïve Bayes, k-nearest neighbor (Knn), K means clustering, control barrier functions, random forest, dimensionality reduction algorithms, gradient boosting algorithms, neural networks (e.g., one or more auto-encoders, convolutional, recurrent, perceptrons, Long/Short Term Memory (LSTM), Hopfield, Boltzmann, deep belief, deconvolutional, generative adversarial, liquid state machine, etc. neural networks), and/or other types of machine learning model.

In one or more embodiments, the one or more control policies define the mappings as control invariant sets of the joint states and the control actions. By defining the mappings as control invariant sets, following the control actions provided using the one or more control policies may result in the machine remaining within the learned state-dependent control sets. Thus, control actions may be provided with safety guarantees corresponding to the state-dependent control sets, such as that following the control actions are likely to avoid collisions.

In at least one embodiment, the state-dependent control sets may be modeled using a control-affine system. The control-affine system may be formulated, for example, in accordance with Equation (1):

$$\dot{x}=f(x)+g(x)u, \qquad (1)$$

where $x \in X \subset \mathbb{R}^n$ and $u \in U \subset \mathbb{R}^m$, and where $f: X \rightarrow \mathbb{R}^n$ and $g: X \rightarrow \mathbb{R}^{m_A}$ are locally Lipschitz continuous.

In one or more embodiments, the one or more control policies may be learned using one or more functions that can be used to describe control invariant sets, such as one or more control barrier functions (CBFs). For example, the one or more MLMs may include one or more high-order CBFs (HOCBFs). An HOCBF may be used to describe control invariant sets given system dynamics and an unsafe set to avoid even if the relative degree is greater than one.

A CBF may be defined in accordance with Equation (2):

$$\max_{u \in U} \nabla b(x)^T f(x, u) \geq -\alpha(b(x)) \forall\, x \qquad (2)$$

wherein a valid CBF ensures that there exists a feasible control action that prevents b(x(t)) from decreasing faster than a rate of −α(b(x)) along system trajectories. The parameters of an α function may affect the size and shape of the control invariant set and may be learned to define the one or more control policies.

Referring now to FIG. 2B, FIG. 2B includes an example graph 220 of a control barrier space which may be used to learn control policies used to define safety functions from demonstrations, in accordance with some embodiments of the present disclosure. For example, in the graph 220, the region 230 (the shaded region) may correspond to a region where b(x)<0 and outside of the region 230 may correspond to a region where b (x)>0. Within the region 230 may be considered unsafe, whereas the region outside of the region 230 may be considered safe.

In at least one embodiment, the one or more MLMs use the one or more CBFs as inductive bias in learning the mappings. The one or more CBFs may be used to provide a tractable learning process and a direct and interpretable means to obtain state-dependent control sets. The learning procedure may assume that safe and reasonable drivers do not put themselves in situations where it is not possible for them to avoid collision, and that the dataset S corresponds to safe and reasonable drivers. That is, the drivers may be assumed to execute controls that ensure they continuously stay within a safe set because leaving that set may lead to a collision. For example, safe drivers typically avoid approaching obstacles at high speeds because they may not be able to steer and slow down to avoid the obstacles. As such, this safe set may define a control invariant set. Thus, given the dataset S of safe and collision-free trajectories, the control policy determiner 106 may learn a control invariant set and corresponding control sets.

While the control policy determiner 106 may use negative examples for training, their explicit collection may be impractical, especially using real-world data where collisions are expensive, dangerous, and/or rare. Thus, the control policy determiner 106 may use learning processes that do not require negative examples.

In at least one embodiment, the learning process may seek to find $\alpha_i$, i=1, ... $m_{rel}$ such that $u^{(j)} \in K_{HOCBF}(x^{(j)})$ for all $(x^{(j)}, u^{(j)}) \in S$. In doing so, the α functions may be learned such that for all datapoints, the HOCBF control constraint is satisfied and the states are within the control invariant set, even where the dataset S contains outliers or noise.

In at least one embodiment, when learning the one or more control policies, the control policy determiner 106 may account for the joint dynamics of entities using, for example, one or more terms corresponding to ego entity A's control actions $u_A$ and entity B's control actions $u_B$. Various approaches may be used to select a value for control actions $u_B$, such as using a ground truth value if available in the dataset S, assuming worst-case control actions, and/or predicting a distribution over entity B's controls and determining the control actions from the distribution (e.g., a worst-case with respect to the predictions).

In one or more embodiments, if the dynamics between entities are differentiable, and the barrier function b is also smooth and differentiable, the one or more control policies may be learned using standard gradient descent algorithms.

If negative examples are available in the dataset S (e.g., from real-world driving logs and/or synthetically generated data), one or more terms of the learned function may be used to bias the negative examples to violate the control constraint and have negative effective CBF values. While CBFs are provided as examples used to define control constraints on learning, one or more other control constraints may be used in addition to or instead of those defined using CBFs.

Once the one or more control policies are learned, the safety function determiner 108 may use the one or more control policies to determine a safety function(s) that computes based at least on one or more joint states between entities, output indicating a likelihood of collision between the entities when the entities operate in accordance with the one or more control policies. In at least one embodiment, a safety function may be formulated using one or more reachability functions, such as one or more Hamilton-Jacobi (HJ) reachability functions. HJ reachability may refer to a mathematical formalism for characterizing the performance and safety properties of dynamical systems. While HJ reachability functions are described, other types of functions may be determined to characterize the performance and safety properties associated with the one or more control policies. In at least one embodiment, the safety function(s) may be learned jointly with the one or more control policies, and/or may be incorporated into one or more MLMs used to learn the one or more control policies.

The safety functions determined using the safety function determiner 108 may include, for example, one or more functions to, based at least on an input state corresponding to an environment, provide output indicating a distance (a measure) to collision and/or another state satisfying one or more defined criteria (a safety distance function). Additionally, or alternatively, the safety functions determined using the safety function determiner 108 may include, for example, one or more functions to, based at least on an input state corresponding to an environment, provide output indicating one or more control actions that prevent the distance to collision from decreasing or otherwise violating one or more defined criteria (a safety control function). In one or more embodiments, the safety function determiner 108 may determine a safety control function using a safety distance function.

Consider a target set T which may refer to the set of collision states between entities A and B. An HJ reachability formulation may describe a two-player differential game to determine whether it is possible for entity A to avoid entering the target set T under any family of closed-loop policies of the entity B, as well as the entity A's appropriate control policy for ensuring safety. The collision avoidance problem may be reduced to solving the Hamilton-Jacobi-Isaacs partial differential equation (3):

$$\frac{\partial V(x, t)}{\partial t} + \min\{0, \max_{u^A \in U^A} \min_{u^B \in U^B} \nabla_x V(x, t)^T f(x, u_A, u_B)\} = 0, \qquad (3)$$

$$V(x, 0) = \ell(x),$$

where $x \in X$ may refer to the joint state of entities A and B, $u_A \in U_A$ and $u_B \in U_B$ may refer to the available (bounded) control actions of the entities A and B, respectively, and f(., ., .) may refer to the join dynamics measurable in $u_A$ and $u_B$ for each state x, uniformly continuous, bounded, and Lipschitz continuous in x for fixed $u_A$ and $u_B$. The boundary condition may be defined by the function $\ell : X \to \mathbb{R}$ having a zero sub-level set encoding the target set T. An HJ value function may refer to the solution V(x, t), t∈[−T,0]— capturing the lowest value of ℓ(.) along the system trajectory within |t| seconds if the system starts at state x and both entities A and B act optimally. In at least one embodiment, the HJ value function may correspond to a safety distance function determined using the safety function determiner 108. In at least one embodiment, a safety control function may be determined using the safety function determiner 108 according to $$U_{safe}^A = \{u_A \in U_A \mid \min_{u^B \in U^B} \frac{\partial V(x, t)}{\partial t} \geq 0\}.$$

Directly incorporating the learned control policies into equation (3) may place the burden of constraint satisfaction on the entity B, which acts second. This may impose a strong assumption that uncontrolled entities behave responsibly with respect to the learned control policy constraints. To shift the burden of constraint satisfaction, the ordering in which the entities act may be swapped to result in a more conservative safety distance function where the entity B acts first. The reformulated reachability problem may correspond to Equation (4):

$$\min_{u^B \in \bar{U}^B} \max_{u^A \in U^A(U^B)} \nabla_x V(x, t)^\top \left[ f(x) + g(x)u^A + h(x)u^B \right] \quad (4)$$

such that the learned control policy holds. This formulation may compute the worst-case responsible contender policy, where responsible behaviors may be those that ensure the learned control policy is satisfied. This constrained formulation may assume the entity B acts first and uses one or more control actions that ensure there exists one or more control actions for the entity A to choose from while satisfying the learned control policy. Thus, the entity A may bear the burden of constraint satisfaction under this formulation.

Figure 3:
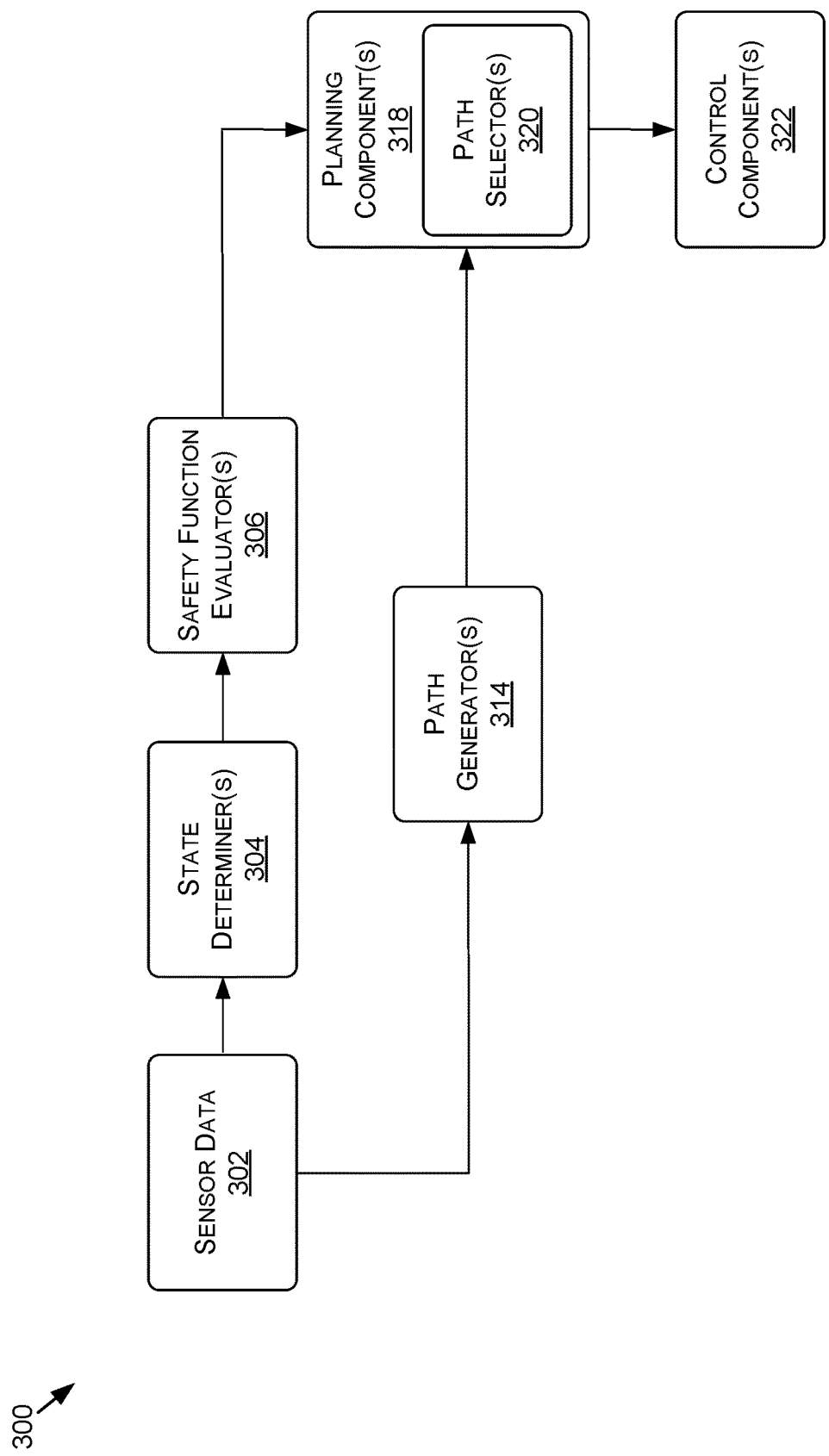
FIG. 3 includes an example data flow diagram for a process of controlling a machine using safety functions, in accordance with some embodiments of the present disclosure.

Having determined the one or more safety functions, the one or more safety functions may be used to perform one or more control operations for a machine, such as the vehicle 800. For example, the machine may perform one or more control actions selected and/or determined using a safety control function. Non-limiting examples of performing one or more control operations using safety functions are described with respect to FIG. 3. Referring now to FIG. 3, FIG. 3 includes an example data flow diagram for a process 300 of controlling a machine using safety functions, in accordance with some embodiments of the present disclosure.

The process 300 may include generating and/or receiving sensor data 302 generated using one or more sensors. The sensor data 302 may be generated using similar or different approaches as the sensor data 102. Thus, the sensor data 302 may include at least one of one or more physical sensors in a physical environment or one or more virtual sensors in a simulated environment. For example, the one or more sensors may be included in a physical or simulated version of the vehicle 800, as described herein. In at least one embodiment, the one or more sensors may correspond to one or more of the same or different sensors and/or vehicles as those used in the process 100.

The sensor data 302 may include, without limitation, sensor data 302 from any of the sensors of the vehicle 800 (and/or other vehicles or objects, such as robotic devices, VR systems, AR systems, etc., in some examples). For example, and with reference to FIGS. 8A-8C, the sensor data 302 may include the data generated by, without limitation, global navigation satellite systems (GNSS) sensor(s) 858 (e.g., Global Positioning System sensor(s), differential GPS (DGPS), etc.), RADAR sensor(s) 860, ultrasonic sensor(s) 862, LIDAR sensor(s) 864, inertial measurement unit (IMU) sensor(s) 866 (e.g., accelerometer(s), gyro scope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800 and/or distance traveled), and/or other sensor types.

In some examples, the sensor data 302 may include sensor data generated using one or more forward-facing sensors, side-view sensors, and/or rear-view sensors. This sensor data 302 may be useful for identifying, detecting, classifying, and/or tracking movement of objects around the vehicle 800 within the environment. In embodiments, any number of sensors may be used to incorporate multiple fields of view (e.g., the fields of view of the long-range cameras 898, the forward-facing stereo camera 868, and/or the forward facing wide-view camera 870 of FIG. 8B) and/or sensory fields (e.g., of a LIDAR sensor 864, a RADAR sensor 860, etc.).

The sensor data 302 may include image data representing an image(s), image data representing a video (e.g., snapshots of video), data representing sensory fields of sensors (e.g., depth maps for LIDAR sensors, a value graph for ultrasonic sensors, etc.), and/or data representing measurements of sensors. Where the sensor data 302 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 302 may be used within the process 300 without any pre-processing (e.g., in a raw or captured format), while in other examples, the sensor data 302 may undergo pre-processing (e.g., noise balancing, demosaicing, scaling, cropping, augmentation, white balancing, tone curve adjustment, etc., such as using a sensor data pre-processor (not shown)). As used herein, the sensor data 302 may reference unprocessed sensor data, pre-processed sensor data, or a combination thereof.

The sensor data 302 may be used, at least in part, by a state determiner 304 to determine one or more parameters of one or more states of the environment. For example, the state determiner 304 may determine any of the various parameters used as input to any of the various safety functions described herein, such as the state of each entity or actor evaluated using the safety functions. In one or more embodiments, the state determiner 304 may determine the one or more parameters of one or more states using similar or different approaches as the observation determiner 104.

Thus, the state determiner 304 may determine the state using any combination of sensors, such as the GNSS sensors 858, the IMU sensor(s) 866, the speed sensor(s) 844, the steering sensor(s) 840, etc. In at least one embodiment, the state determiner 304 may determine and/or infer the state of the objects in the environment—e.g., other than the vehicle 800—using any combination of the stereo camera(s) 868, the wide-view camera(s) 870, the infrared camera(s) 872, the surround camera(s) 874, the long range and/or mid-range camera(s) 898, the LIDAR sensor(s) 864, the RADAR sensor(s) 860, the microphone(s) 896, the ultrasonic sensor(s) 862, and/or other sensors of the vehicle 800. In some examples, the state of the objects (e.g., when one or more of the objects is another vehicle, or a person using a client device capable of wireless communication) may be determined using wireless communications, such as vehicle-to-vehicle communication, or device-to-vehicle communication, over one or more networks, such as, but not limited to, the network(s) described herein.

In at least one embodiment, the one or more parameters may correspond to one or more characteristics of the environment, for example, to provide context to joint states of entities (e.g., semantic information). Examples of the one or more characteristics include road geometry characteristics, road feature characteristics (e.g., signs, road type, road markings, road conditions, etc.), weather characteristics, visibility characteristics, and/or other extrinsic characteristics which may impact the control action behavior of at least one of the entities. In at least one embodiment, the one or more parameters may correspond to one or more driving maneuvers and/or types of driving maneuvers with respect to one or more actors, such as a lane change maneuver, a passing maneuver, a parking maneuver, etc. In at least one embodiment, one or more of the parameters may be assigned to and/or associated with one or more scenarios. A scenario may be defied, for example, using one or more environmental characteristics and/or driving maneuver parameters.

In some examples, machine learning models, such as neural networks (e.g., convolutional neural networks), may be used to determine the one or more parameters. For example, sensor data from the sensors of the vehicle 800 may be applied to one or more machine learning models in order to determine the one or more parameters. The neural networks may execute on processed and/or unprocessed data for a variety of functions. For example, and without limitation, a convolutional neural network may be used for object detection and identification (e.g., using sensor data from camera(s) of the vehicle 800), a convolutional neural network may be used for distance estimation (e.g., using the sensor data from the camera(s) of the vehicle 800), a convolutional neural network may be used for emergency vehicle detection and identification (e.g., using sensor data from the microphone(s) of the vehicle 800), a convolutional neural network may be used for facial recognition and vehicle owner identification (e.g., using the sensor data from the camera(s) of the vehicle 800), a convolutional neural network may be used for identifying and processing security and/or safety related events, and/or other machine learning models may be used. In examples using convolutional neural networks, any type of convolutional neural networks may be used, including region-based convolutional neural networks (R-CNNs), Fast R-CNNs, and/or other types. In addition to or alternatively from CNNs, any other type of machine learning model may be implemented.

In embodiments where the sensor data 302 corresponds, at least in part, to simulated sensor data, the simulated sensor data may be generated using one or more simulators. For example, the simulated sensor data may correspond to simulation data generated using a simulation application, such as an autonomous vehicle drive simulator (e.g., NVIDIA's DRIVESIM).

The simulation data may include snapshots, pictures, samples and/or other data about the world state of the simulated or virtual world at each frame. For example, the simulated sensor data may include information about where actors are located in the world, their speeds, accelerations, poses, etc., information about the state of traffic lights or signals, information about the location of traffic signs, stop lines, etc. The world-state may be perceived by the vehicle 800, other vehicles, and/or other systems.

A safety function evaluator 306 may use the one or more parameters to evaluate the one or more safety functions. In at least one embodiment, the safety function evaluator 306 evaluates and/or selects the one or more safety functions based at least on the one or more scenarios, as described herein. For example, the safety function determiner 108 may determine one or more safety functions for one or more scenarios and the safety function evaluator 306 may use at least one of the one or more parameters to select one or more corresponding safety functions. Additionally, or alternatively, at least one of the one or more parameters may be incorporated into one or more of the safety functions. For example, a parameter input to a safety function may indicate a presence of a weather condition, a degree of a weather condition (e.g., a severity of rain, fog, etc.), a confidence value corresponding to a scenario, etc. Additionally, or alternatively, the safety function evaluator 306 may use at least one of the one or more parameters to determine a safety function does not apply to a state of the environment being evaluated. In such examples, output from the safety function may not be used to perform one or more control operations for the machine.

Figure 4:
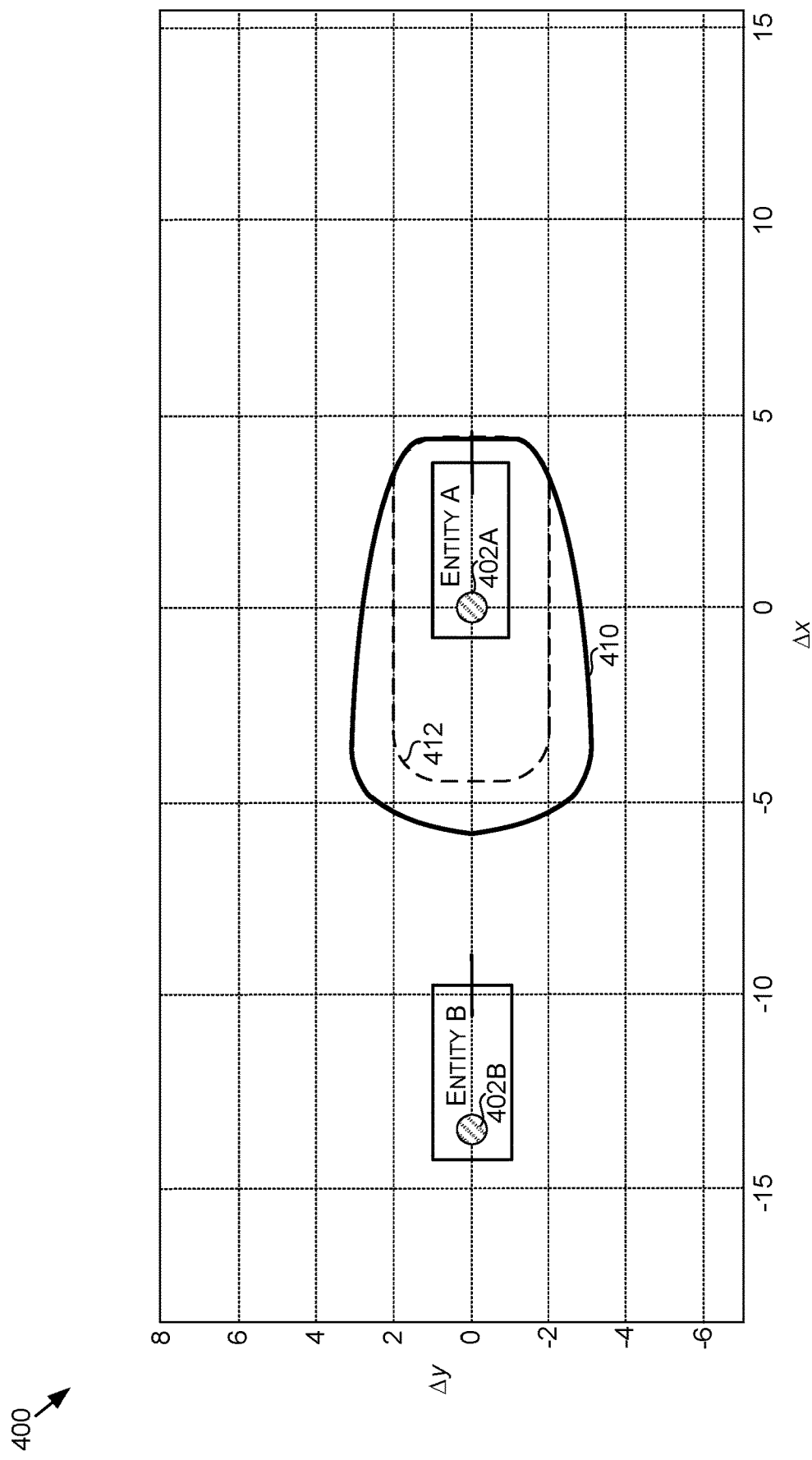
FIG. 4 includes an example graph of output corresponding to a safety function in positional space, in accordance with some embodiments of the present disclosure.

Referring now to FIG. 4, FIG. 4 includes an example graph 400 of output corresponding to a safety function in positional space, in accordance with some embodiments of the present disclosure. The graph 400 may correspond to a car-following scenario computed over a two second horizon. The graph 400 indicates a location 402A corresponding to the entity A and a location 402B of the entity B. The graph 400 also indicates a slice 410 of an output of an HJ value function in $\Delta x$-$\Delta y$ space, where the output corresponds to the locations 402A and 402B, for given accelerations of the entity A and the entity B. The graph 400 further indicates a slice 412 for V(x, 0). As the HJ value function corresponds to a control policy trained using demonstrations, the slice 410 (indicating unsafe sets) is much smaller than what would otherwise be possible using conservative behavior assumptions. For example, the HJ value function may be less wide than would otherwise be possible, reflecting behavior assumptions that nearby drivers tend to stay within their lanes.

Figure 5:
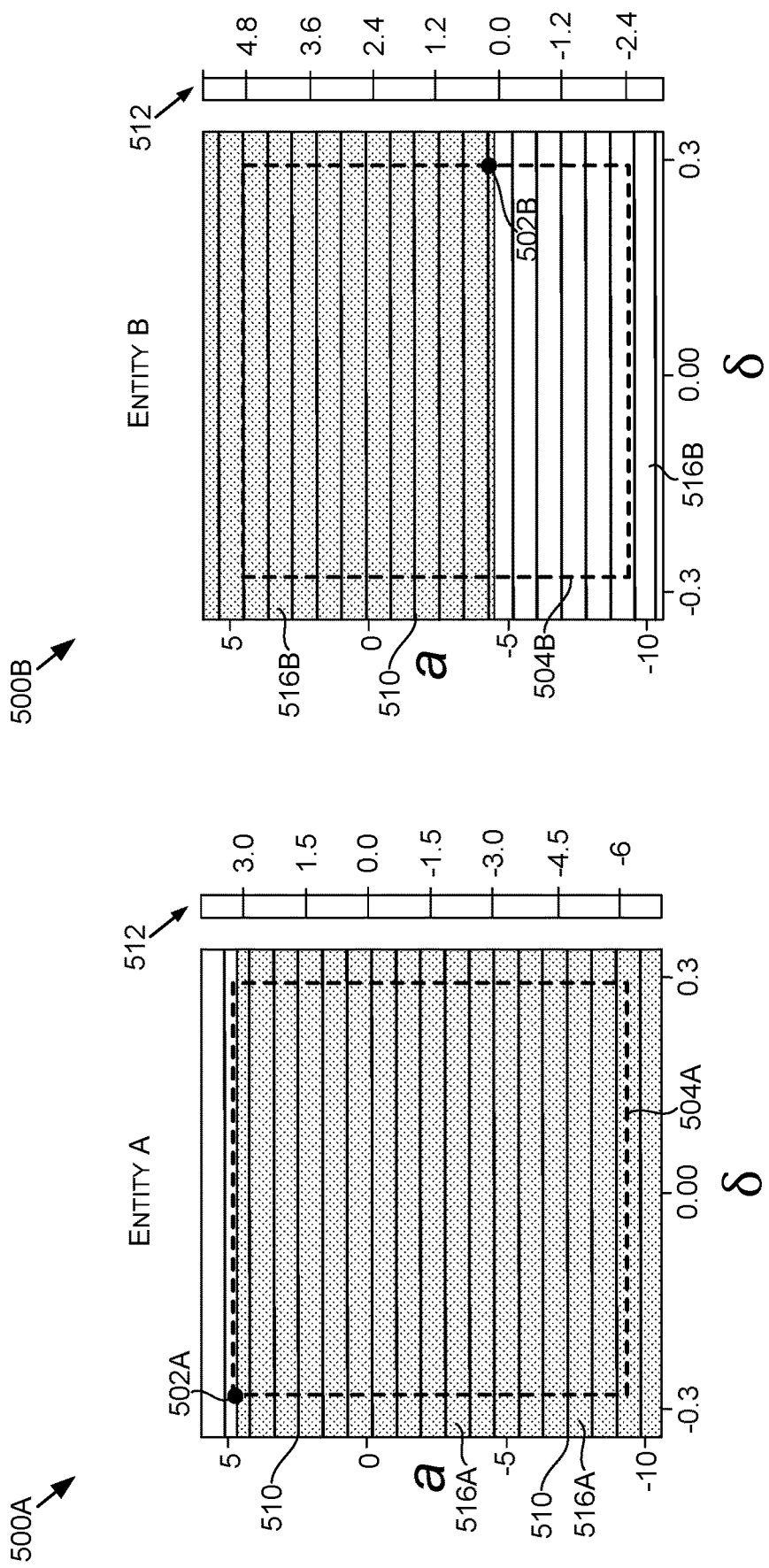
FIG. 5 includes examples of graphs of controls for entities, in accordance with some embodiments of the present disclosure.

Referring now to FIG. 5, FIG. 5 includes examples of graphs 500A and 500B of controls for entities, in accordance with some embodiments of the present disclosure. In particular, the controls may correspond to output of a safety control function that is based on the HJ value function of FIG. 4. The graph 500A indicates control actions for the entity A, including optimal control actions 502A and control action bounds 504A, for various steering tangents ($\delta$) and acceleration values (a). Similarly, the graph 500B indicates control actions for the entity B, including optimal control actions 502B and control action bounds 504B, for various steering tangents ($\delta$) and acceleration values (a). The contours for graphs 500A and 500B, of which contours 510 are labeled, correspond to $V(x, t)^T g(x)u^A$ and $V(x, t)^T h(x)u^B$, respectively, which correspond to the quantities 512 that each entity may be trying to minimize. The shaded regions 516A and 516B of the graphs 500A and 500B indicate infeasible or unsafe controls, reflecting the notion that it would be unreasonable or uncommon for the Entity A to operate under the assumption that the Entity B will aggressively accelerate from behind—despite some conservative behavior assumptions assuming aggressive acceleration behavior.

In at least one embodiment, the safety function evaluator 306 provides output corresponding to the evaluation of the one or more safety functions to a planning component(s) 318. For example, the output may correspond to one or more distance values indicated by output of a safety distance function. Additionally, or alternatively, the output may correspond to one or more control actions indicated by output of a safety control function. The planning component 318 may determine and/or select the one or more control operations for the machine using the output from the safety function evaluator 306. The planning component(s) 318 (e.g., a motion planner) of an autonomous driving software stack may pass information indicating the one or more control operations to a control component(s) 322 of the autonomous driving software stack, and the control component(s) 322 may determine controls for the vehicle 800 for actuating the vehicle 800 according to the control operations. This process may be completed at each time instance and/or for each state of the environment such that new control operations and/or controls are generated, analyzed, and selected, and the vehicle 800 follows the control operations selected by the planning component 318 along the way.

By way of example, and not limitation, the one or more control operations may correspond to one or more paths determined using a path selector 320 of the planning component 318. For example, the path selector 320 may determine, using output from the safety function evaluator 306, a final path for the vehicle 800 to follow. In at least one embodiment, a path generator 314 may be used to generate multiple paths, and the path selector 320 may use the multiple paths to determine (e.g., select) the final path. For example, each path may be generated with multiple time steps or stamps (e.g., 0, 1, 2, and 3) and the individual time steps for each path and/or the paths as a whole may be given a weight or score, with the final value for each path being used by the path selector 120 in selecting a final path from the paths. In at least one embodiment, the weights or scores may correspond to output of the one or more safety functions (e.g., output values).

In examples where the path selector 320 evaluates one or more paths, the one or more paths may be generated using the path generator 314. In at least one embodiment, the path generator 114 uses the sensor data 302 to generate one or more proposed paths for the vehicle 800 and/or predicted paths for actors or objects in the environment. For example, the path generator 114 may generate any number of paths for the vehicle 800, and the proposed paths may be analyzed using the path selector 320—e.g., in view of safety or collision avoidance considerations, comfort considerations, consistency considerations, power/gas consumption considerations, conforming to rules of the road, etc.—to determine which path to select as the actual path of the vehicle 800.

In at least one embodiment, the safety or collision avoidance considerations may be used to filter and/or penalize (e.g., apply or attribute a negative or lower weight value to) paths where collision or possible collision events are indicated by the one or more safety functions, reward (e.g., apply or attribute a positive or higher weight value to) paths where an absence of a collision or possible collision event is indicated, and/or the like.

Figure 6:
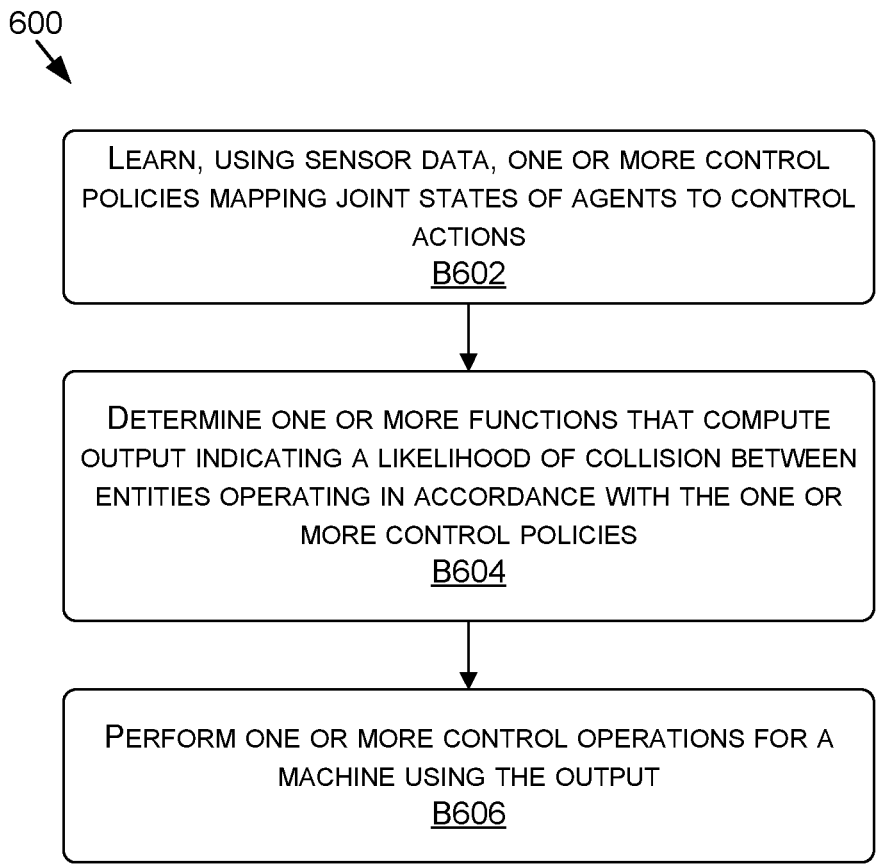
FIG. 6 is a flow diagram showing a method for determining a function to compute likelihoods of collisions using from a control policy learned from sensor data, in accordance with some embodiments of the present disclosure.

Now referring to FIG. 6, each block of method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to FIGS. 1 and 3. However, these methods may additionally or alternatively be executed by any one system, or any combination of systems, including, but not limited to, those described herein.

Referring now to FIG. 6, FIG. 6 is a flow diagram showing a method 600 for determining a function to compute likelihoods of collisions using from a control policy learned from sensor data, in accordance with some embodiments of the present disclosure. The method 600, at block B602, includes learning, using sensor data, one or more control policies mapping joint states of agents to control actions. For example, the observation determiner 104 and the control policy determiner 106 may apply sensor data generated using one or more sensors to one or more machine learning models to learn one or more control policies mapping joint states to control actions. The joint states may be between agents, such as the entity A (e.g., a vehicle 800) and the entity B (e.g., a contender). The control actions may be of at least one of the agents.

At block B604, the method 600 includes determining one or more functions that compute output indicating a likelihood of collision between entities operating in accordance with the one or more control policies. For example, the safety function determiner 108 may determine one or more functions that compute, based at least on one or more joint states between entities, output indicating a likelihood of collision between the entities operating in accordance with the one or more control policies.

At block B 606, the method 600 includes performing one or more control operations for a machine using the output. For example, the control component 322 may perform one or more control operations for a machine (e.g., the vehicle 800) using the output indicating the likelihood of collision (e.g., in accordance with the process 300 of FIG. 3).

Referring now to FIG. 7, FIG. 7 is a flow diagram showing a method 700 for learning vehicle safety concepts from demonstrations, in accordance with some embodiments of the present disclosure. The method 700, at block B702, includes learning, from demonstrations, one or more control policies mapping joint states of at least two entities to control actions. For example, the control policy determiner 106 may learn, using first data representing demonstrations of at least one first entity (e.g., the Entity A) navigating through an environment, one or more control policies mapping joint states to control actions. The joint states may be being between the at least one first entity and at least one second entity (e.g., the Entity B). The control actions may be of the at least one first entity.

At block B704, the method 700 includes determining, using the one or more control policies, second data indicating a likelihood of collision between entities operating in accordance with the one or more control policies. For example, the safety function evaluator 306 may determine, based at least on one or more joint states between entities and using the one or more control policies, second data indicating a likelihood of collision between the entities operating in accordance with the one or more control policies.

At block B706, the method 700 includes performing one or more control operations for a machine using the output. For example, the control component 322 may perform one or more control operations for a machine (e.g., the vehicle 800) using the output indicating the likelihood of collision (e.g., in accordance with the process 300 of FIG. 3).

Example Autonomous Vehicle

Figure 8A:
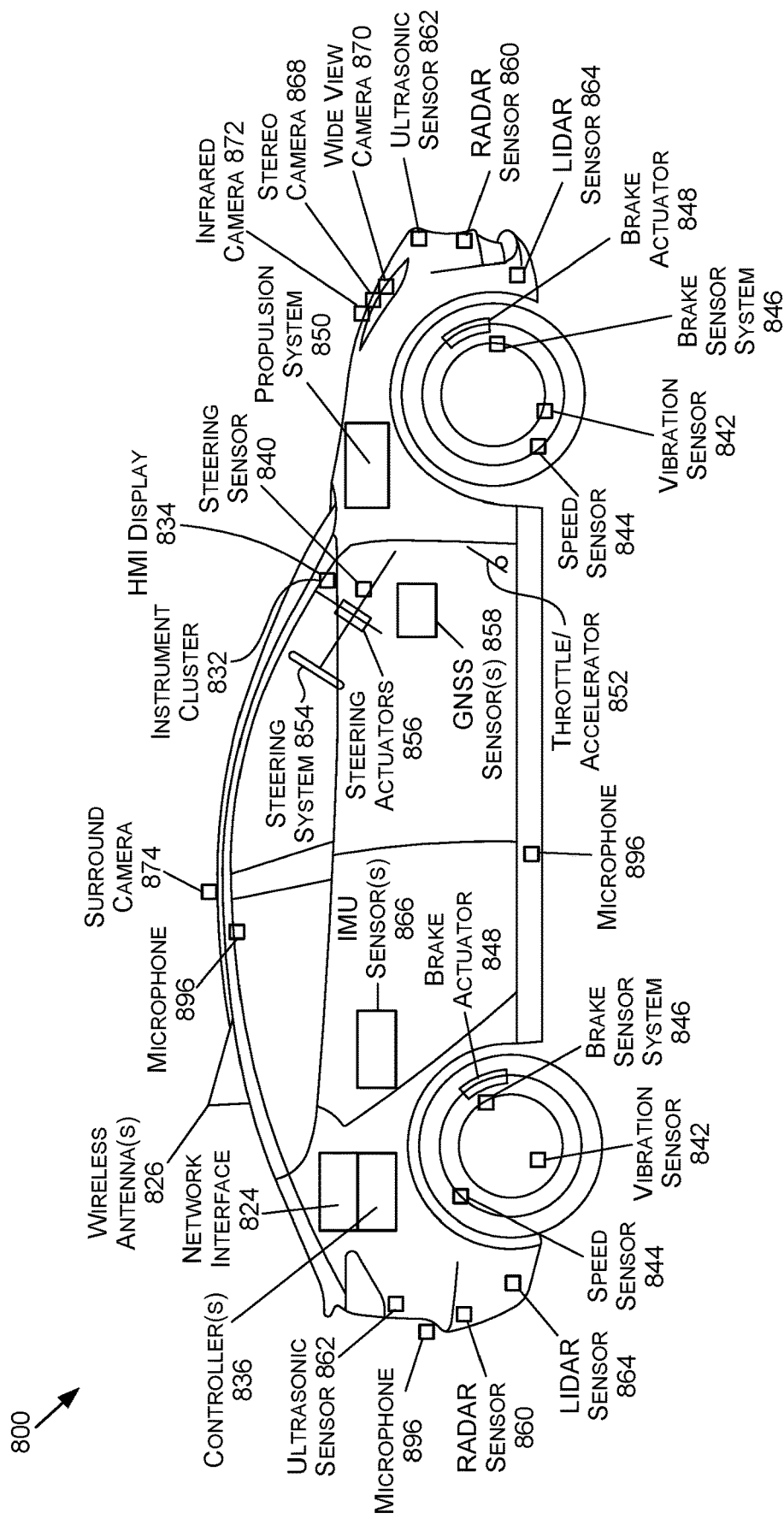
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyro scope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UNITS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
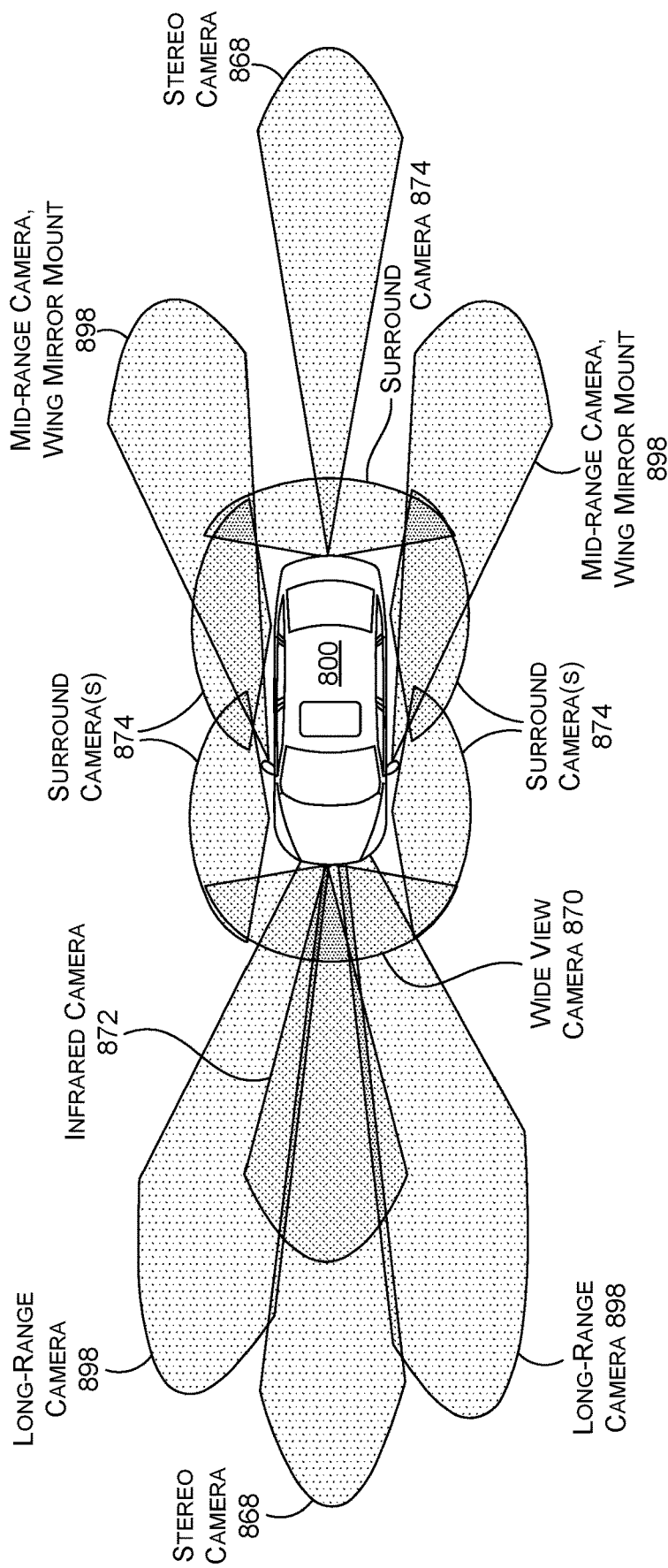
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RB GC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
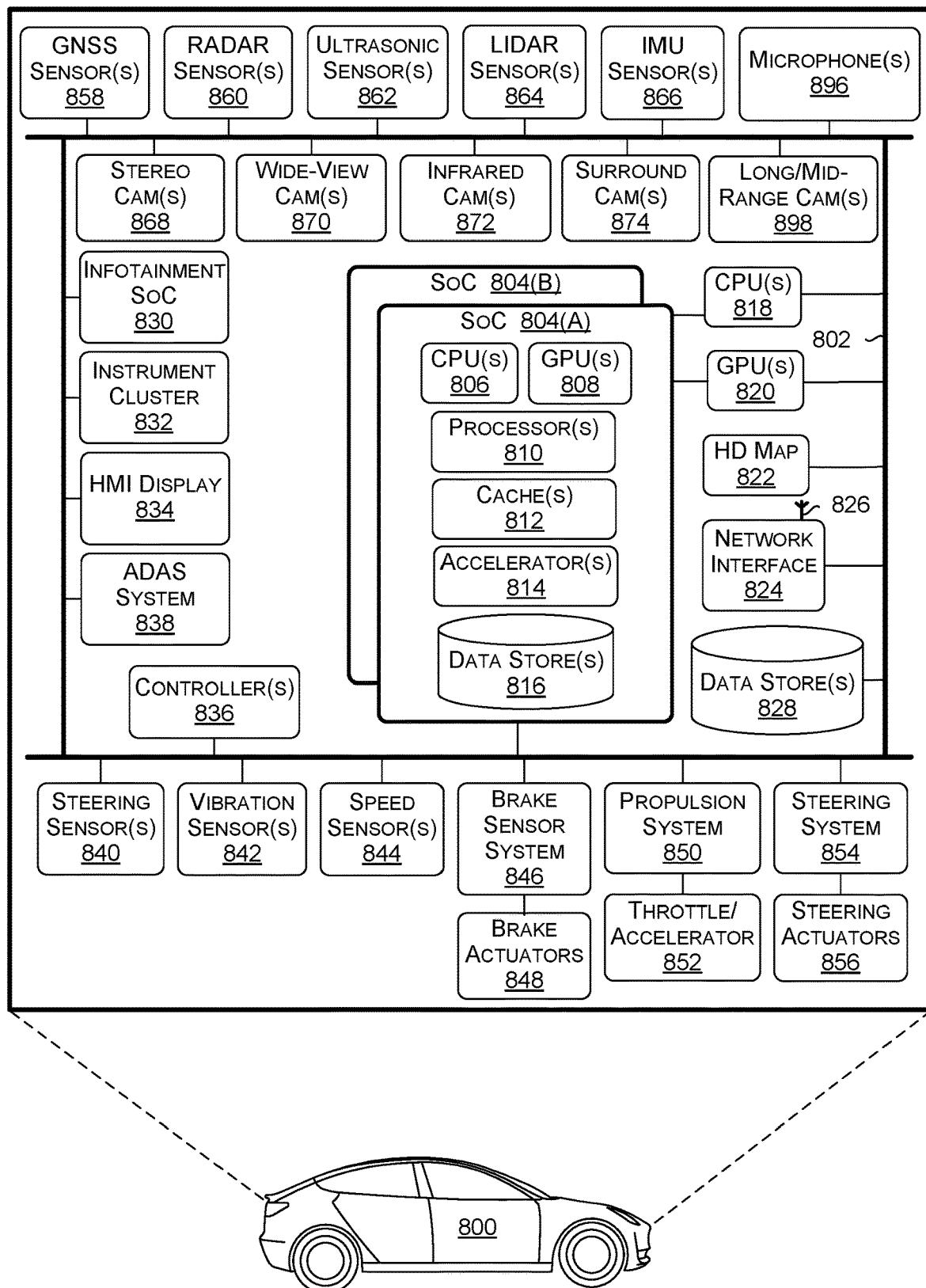
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 804 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
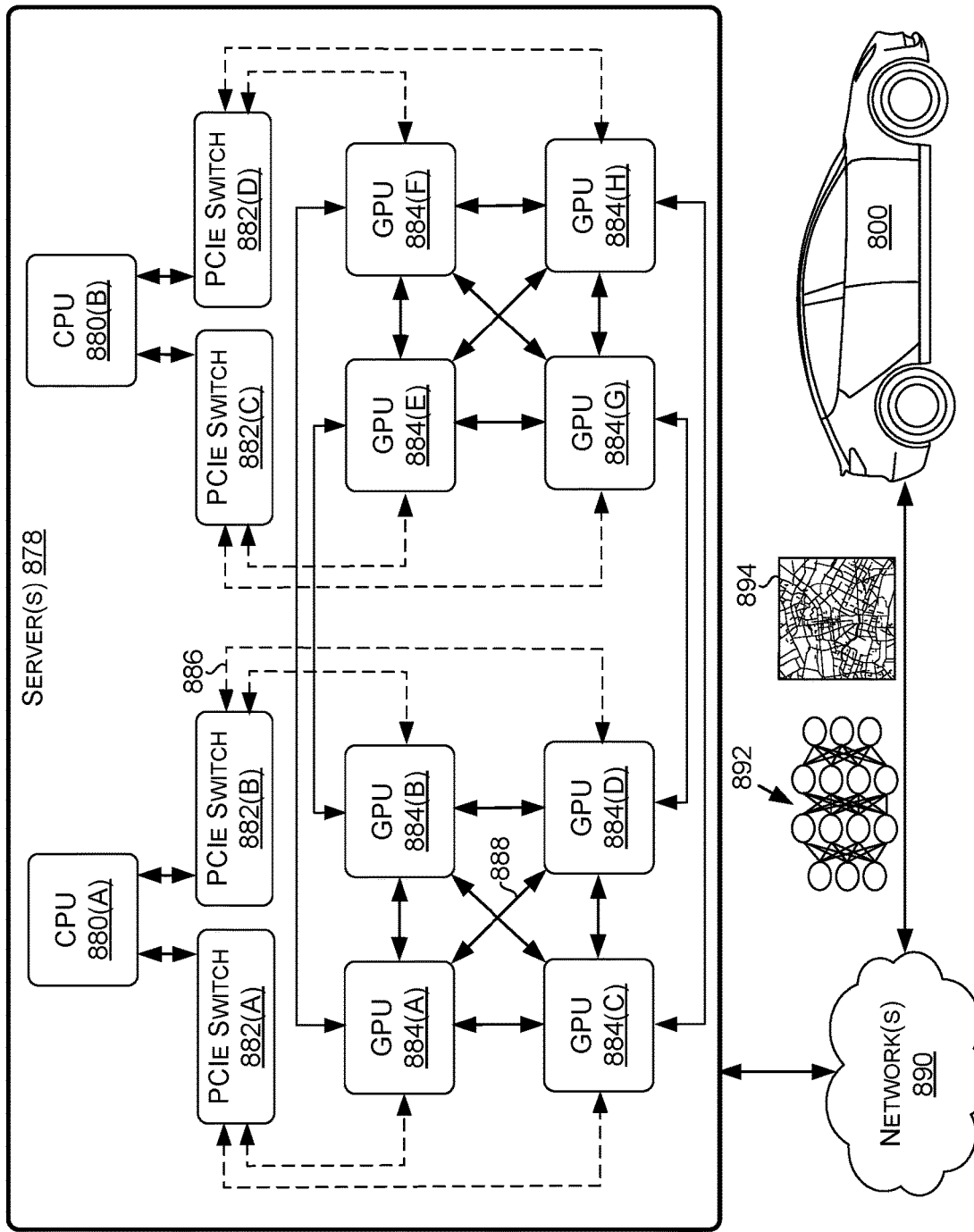
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
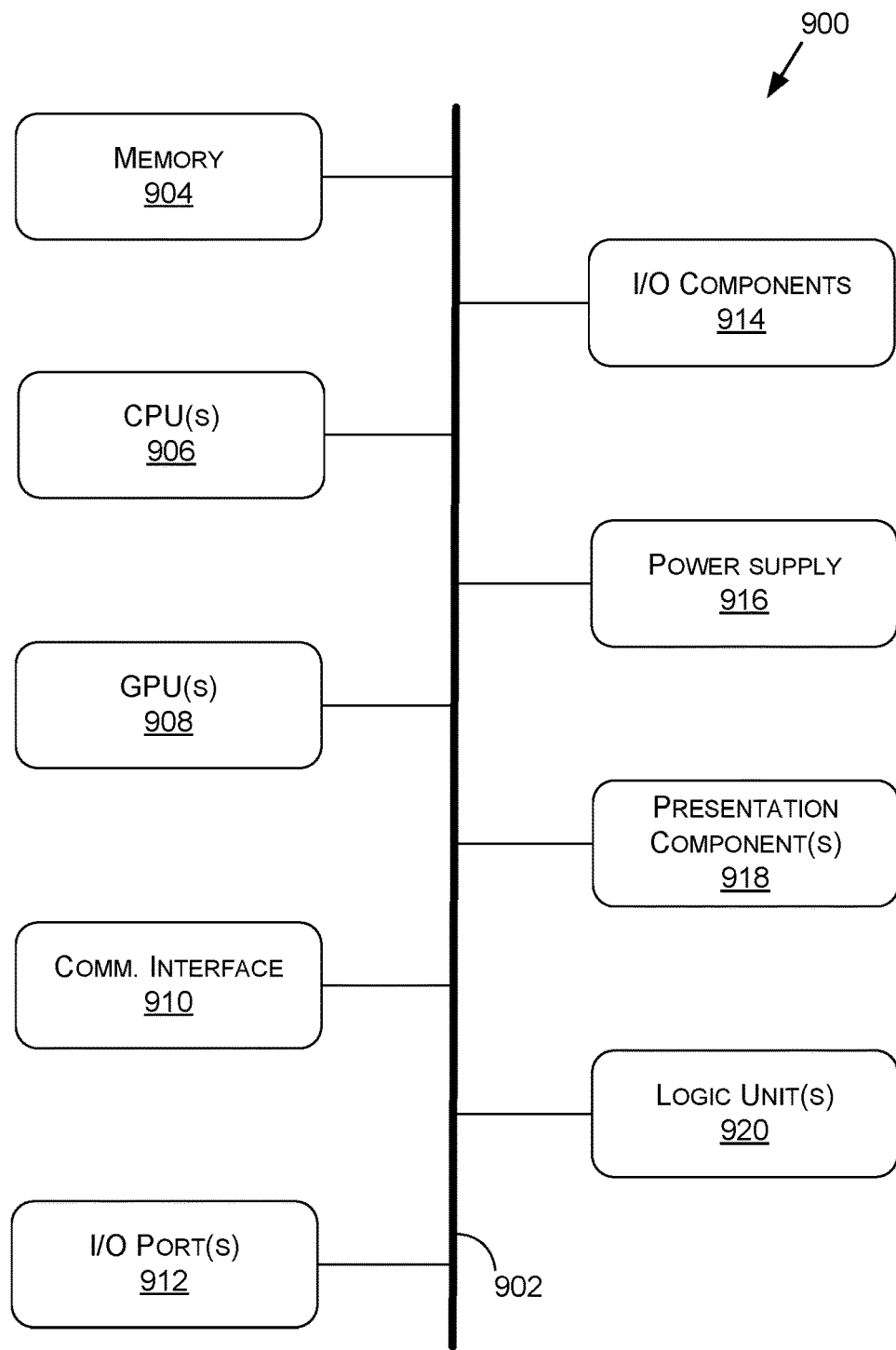
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
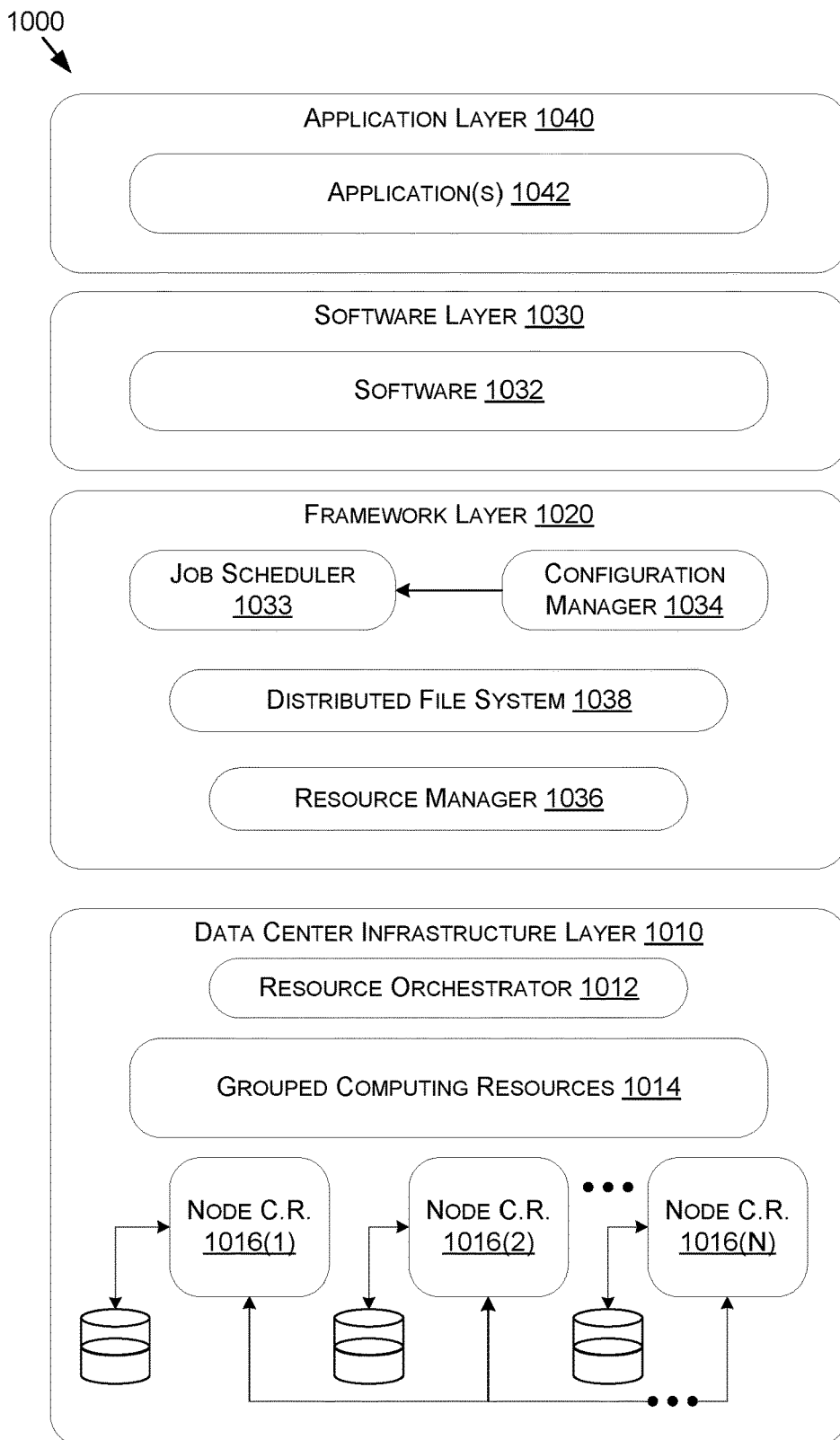
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    applying, to at least one machine learning model (MLM), a dataset corresponding to sensor data obtained using one or more sensors of a plurality of machines, the dataset representing examples of collision-free trajectories using joint states of entities navigating through an environment;
    based at least on the applying, training the at least one MLM to learn a control policy defining a control action space for a machine of the plurality of the machines and to predict, using the control policy and for a joint state between agents, one or more control actions of the control action space for at least one agent of the agents to perform in response to the joint state, the control policy being learned using a function that assigns values to states resulting from control actions of the control action space, the values defining whether the states are within an unsafe region of a state space or a safe region of the state space based at least on a threshold value that defines a boundary between the safe region and the unsafe region, the safe region corresponding to the collision-free trajectories;
    determining one or more functions that compute, based at least on the joint state and for the one or more control actions, output indicating a likelihood of collision if the at least one agent were to use the one or more control actions predicted by the at least one MLM using the control policy; and
    performing one or more control operations for the machine using the output indicating the likelihood of collision.

2. The method of claim 1, wherein the control policy learned by the at least one MLM predicts control-invariant sets comprising joint states and corresponding control actions, the corresponding control actions, when used, resulting in future joint states that remain with the control action space corresponding to the collision-free trajectories.

3. The method of claim 1, wherein the joint state includes one or more of:
    one or more positions of the agents;
    one or more velocities of the agents; or
    one or more headings of the agents.

4. The method of claim 1, wherein a control action of the one or more control actions includes one or more of:
    one or more steering parameters; or
    one or more acceleration parameters.

5. The method of claim 1, wherein the function includes a control barrier function.

6. The method of claim 1, wherein the one or more control operations correspond to a control action and the control action is determined based at least on:
    determining, using the one or more functions, a set of control actions; and
    selecting the control action from the set of control actions.

7. The method of claim 1, wherein the likelihood of collision corresponds to one or more distances of one or more first joint states from one or more second joint states corresponding to the collision between the entities if the at least one agent were to use the one or more control actions predicted by the one or more MLMs.

8. The method of claim 1, wherein the one or more functions are separate from the at least one MLM, and one or more parameters of the one or more functions are learned jointly with the at least one MLM learning the control policy.

9. The method of claim 1, wherein the entities include the machine.

10. A system comprising:
    one or more circuits to perform operations including:
    applying, to at least one machine learning model (MLM), a dataset corresponding to sensor data obtained using one or more sensors of a plurality of machines, the dataset representing examples of collision-free trajectories using joint states of entities navigating through an environment;
    based at least on the applying, training the at least one MLM to learn a control policy defining a control action space for a machine of the plurality of machines and to predict, using the control policy and for a joint state between agents, one or more control actions of the control action space for at least one agent of the agents to perform in response to the joint state, the control policy being learned using a function that assigns values to states resulting from control actions of the control action space, the values defining whether the states are within an unsafe region of a state space or a safe region of the state space based at least on a threshold value that defines a boundary between the safe region and the unsafe region, the safe region corresponding to the collision-free trajectories;
    determining one or more functions that compute, based at least on the joint state and for the one or more control actions, output indicating a likelihood of collision if the at least one agent were to use the one or more control actions predicted by the at least one MLM using the control policy; and performing one or more control operations for the machine using the output indicating the likelihood of collision.

11. The system of claim 10, further comprising determining the joint state based at least on analyzing sensor data obtained using one or more sensors of the machine.

12. The system of claim 10, wherein the function includes a higher order control barrier function.

13. The system of claim 10, wherein one or more functions are separate from the at least one MLM, and one or more parameters of the one or more functions are learned jointly with the at least one MLM learning the control policy.

14. The system of claim 10, wherein the joint state includes one or more of:
one or more positions of the agents;
one or more velocities of the agents; or
one or more headings of the agents.

15. The system of claim 10, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

16. At least one processor comprising:
one or more circuits of a machine to:
determine, using sensor data obtained using one or more sensors, a joint state comprising positions of the machine and an agent in an environment;
apply the positions of the machine and the agent to a neural network that is trained, using a dataset representing demonstrations of collision-free trajectories using joint states of entities navigating through the environment, to learn a control policy defining a control action space for the machine and to predict, using the control policy and for the joint state, one or more control actions of the control action space for the machine, the control policy being learned using a function that assigns values to states resulting from control actions of the control action space, the values defining whether the states are within an unsafe region of a state space or a safe region of the state space based at least on a threshold value that defines a boundary between the safe region and the unsafe region, the safe region corresponding to the collision-free trajectories;
compute, using one or more functions, a likelihood of collision between the machine and the agent, were the machine to use the one or more control actions that were predicted by the neural network; and
perform one or more control operations for the machine based on the likelihood of collision.

17. The at least one processor claim 16, wherein the neural network outputs a representation of the one or more control actions and the one or more functions output the likelihood of collision.

18. The at least one processor claim 17, wherein the joint state includes one or more of:
one or more positions of the agent and the machine;
one or more velocities of the agent and the machine; or
one or more headings of the agent or the machine.

19. The at least one processor claim 16, wherein a control action of the one or more control actions includes one or more of:
one or more steering parameters; or
one or more acceleration parameters.

20. The at least one processor claim 16, wherein the at least one processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

* * * * *